United States Patent [19]

Fischbeck

[11] 4,104,646

[45] Aug. 1, 1978

[54] INK EJECTION

[75] Inventor: Karl-Heinz Fischbeck, Wilhelmshaven, Fed. Rep. of Germany

[73] Assignee: Olympia Werke AG, Wilhelmshaven, Fed. Rep. of Germany

[21] Appl. No.: 749,518

[22] Filed: Dec. 10, 1976

[30] Foreign Application Priority Data

Dec. 11, 1975 [DE] Fed. Rep. of Germany ....... 2555749

[51] Int. Cl.[2] .......................... G01D 15/16; B41J 3/04

[52] U.S. Cl. .................................................. 346/140 R

[58] Field of Search ................................ 346/140 R, 1

[56] References Cited

U.S. PATENT DOCUMENTS 3,683,212 8/1972 Zolton ............................ 346/140 R 4,024,544 5/1977 Vernon ............................ 346/140 R

*Primary Examiner*—Joseph W. Hartary

*Attorney, Agent, or Firm*—Spencer & Kaye

[57] ABSTRACT

An apparatus for controlling the flow of ink in the nozzle of an ink ejector head, the latter having an ink flow system which has a chamber capable of being supplied with ink and a nozzle through which ink is ejected as well as a pressure producer capable of being subjected to pulses for applying pressure on the ink in the chamber so as to cause the ink to be ejected through the nozzle. The pressure producer has applied to it a series of pulses consisting of alternating primary and secondary pulses, the latter occurring a predetermined time interval subsequent to the cessation of the application of the immediately preceding primary pulse.

4 Claims, 6 Drawing Figures

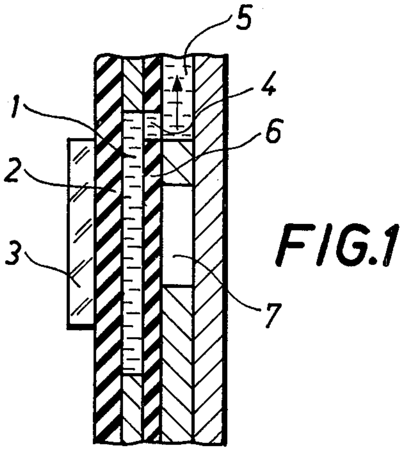
FIG.1
FIG.2
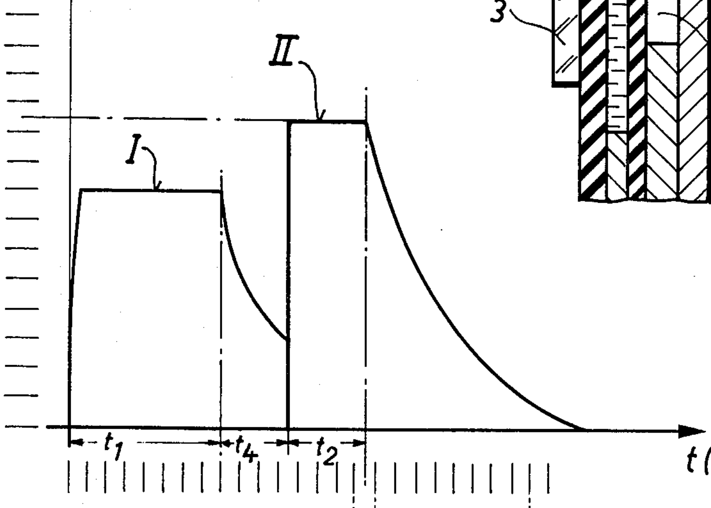
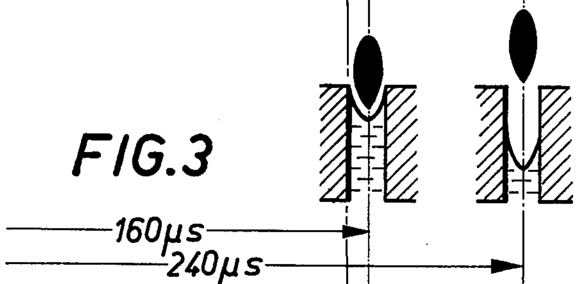
FIG.3
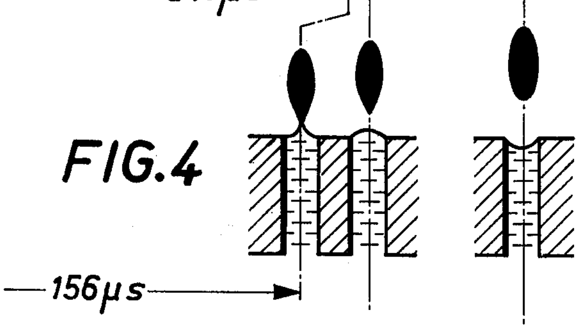
FIG.4
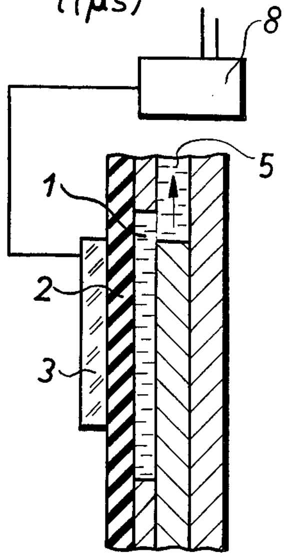
FIG.5

INK EJECTION

BACKGROUND OF THE INVENTION

The present invention relates to the art of ink ejection and more particularly to a method and apparatus for controlling the return flow of the ink in the nozzle of an ink ejector head used in a printer in which ink is ejected in the form of drops or droplets directly onto the paper or other print carrier.

More particularly, the present invention relates to an arrangement having an ink ejector head incorporating an ink flow system which itself has a chamber capable of being supplied with ink from an ink reservoir and a nozzle through which the ink is ejected, and a pressure producer capable of being subjected to pulses for applying pressure to the ink in the chamber so as to cause the ink to be ejected through the nozzle.

In such ink ejector heads, pressure pulses generally occur when the pressure is generated to drive the ink out of the nozzle, which pulses propagate not only toward the nozzle but also in a direction away from the nozzle so that they strike regions from whence they are reflected. The reflected pressure pulses or pressure waves lead to the formation of improperly shaped drops. The drop formation is also influenced by the geometry of the ejection system, the arrangement of the energy flow channels, and the surface configuration of the nozzle and of the chambers. When the pulse is turned off, the pressure producer snaps back to its rest position and this creates a sudden vacuum or reduction of pressure in the ejection system and consequently in the nozzle, and this, in turn, results in rapid return flow of the ink into the nozzle. This not only sucks air from the atmosphere into the nozzle, but also influences the umbilical cord connecting the drops with the quantity of ink flowing back into the nozzle until a drop breaks off, so that secondary or so-called after-drops are formed from the umbilical cord and/or the main drop. These after-drops and the main drop are propelled toward the print carrier and often move at a high velocity different from that of the main drop.

One type of conventional droplet ejector system, such as is shown in German laid-open patent application (Offenlegungsschrift) No. 2,405,584 corresponding to U.S. Pat. No. 3,832,579 issued Aug. 27th, 1974) has an ink drop ejector, a ceramic oscillator attached thereto, an ink inlet and a nozzle for forming the drop. The energy flow channels are within a disc made of pressure absorbing material, which disc additionally has an absorber channel whose length is sufficient to eliminate waves during the generation of pressure. The reflection of waves, and even the reflection of multiple waves, can be eliminated by providing an appropriately appropriated, dimensioned so-called transition zone which includes the absorber channel, the pressure chamber and the outlet channel up to the region of the nozzle. It has been found, however, that the relatively great pressure reduction in the absorber system reduces the amount of energy required for the drop formation which must be compensated for by increasing the pulse voltage for the ceramic oscillator. Moreover, the pressure wave propagation pattern will differ from ink to ink, so that the ejector system has to be specially designed for every different type of ink, to say nothing of the fact that higher voltages across the ceramic oscillator increase the costs of the electronic equipment.

It is, therefore the object of the present invention to control the return flow of ink during the suction phase initiated by the end of the pressure pulse in such a manner that no after-drop is formed or if one is formed, that it will be accelerated to the velocity of the main drop.

BRIEF DESCRIPTION OF THE INVENTION

With the above objects in view, the present invention resides primarily in a method and apparatus relating to an arrangement incorporating an ink ejector head of the above type, and particularly to a method and apparatus by means of which the pulses applied to the pressure producer consist of a train or series of pulses made up of alternating primary and secondary pulses, the latter occurring a predetermined time interval after the cessation of the application of the immediately preceding primary pulse. The significance of such a pulse train, and the interrelation of the primary and secondary pulses with an ejection process, as well as the advantages obtained by the present invention will be described in greater detail below.

BRIEF DESCRIPTION OF THE FIGURES

FIG. 1 is a cross-sectional view of an ejector head shown on an enlarged scale, having an oscillator capable of having the pulse train applied to it.

FIG. 2 shows the voltage curve for the primary and secondary pulses applied across the ceramic oscillator.

FIG. 3 shows the formation of drops in the conventional manner.

FIG. 4 shows how the drops are formed in accordance with the present invention.

FIG. 5 is a cross-sectional view of an ejector head suitable for use in conjunction with the present invention and adapted to receive electrical primary and secondary pulses.

DETAILED DESCRIPTION OF THE PREFERRED EMBODIMENTS

Figure 6:
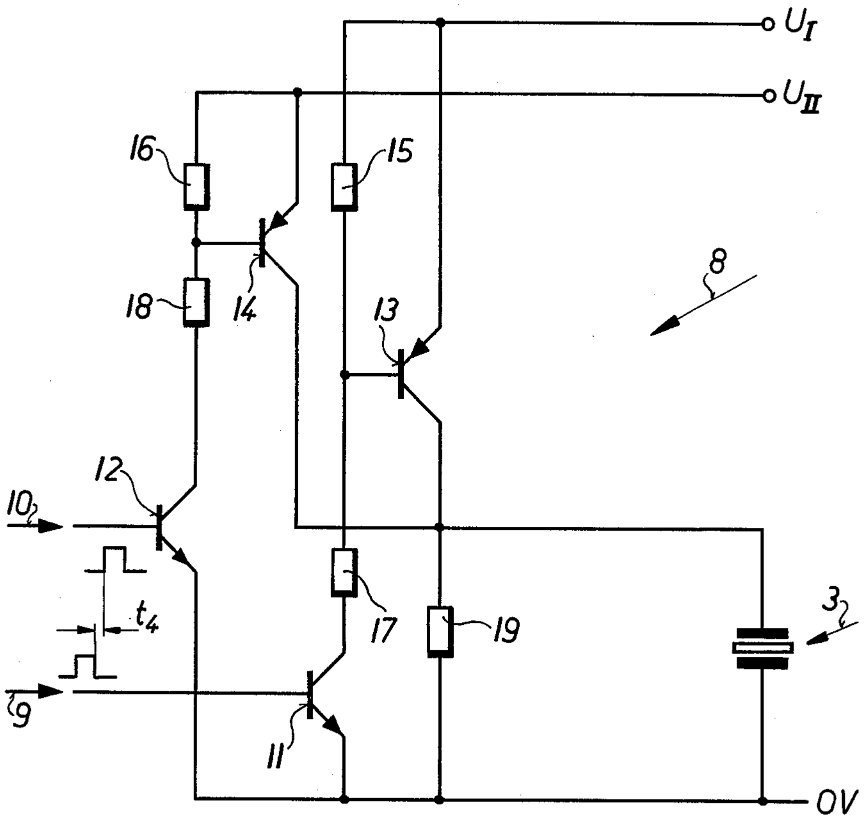
FIG. 6 is a wiring diagram of a control unit to control a ceramic oscillator with two pulses.

FIG. 1 shows an ejector head including an ejection system comprising a chamber 1, a membrane 2, a ceramic oscillator 3 and an outlet channel 4 having a region forming a nozzle 5. The membrane 2 and the ceramic oscillator 3 together constitute the pressure generator or producer. The intake of ink to replenish ejected ink occurs through a channel (not shown) which is in communication with a reservoir (not shown). When a primary pulse corresponding approximately to the voltage pulse I of FIG. 2 is applied across the ceramic oscillator 3, the oscillator is arched and the cross section of chamber 1 is reduced. The pressure wave produced in this manner is propagated in the ink and produces a main drop as well as after-drops. The formation of one such drop is shown in FIG. 3.

The ejector head of FIG. 1 further comprises a disc-shaped membrane 6 which seals an air-filled cavity 7 from the ejection system. This membrane 6 extends across the cross section of the head but allows the flow of ink to the nozzle. If this membrane is an elastic element, energy can be stored when the pressure generator 2, 3 is charged, which energy produces a secondary pulse II that counteracts the outside air pressure and prevents the entry of a column of air into the nozzle above the returning stream of ink when there is a pressure reduction in the ejection system, i.e. at the time a drop is ejected, because the now-stored energy is released. The force components which sever the after-drop from the main drop and from the umbilical cord is thus much smaller so that the after-drop retains the velocity of the main drop. The formation of the drop is shown in FIG. 4 and will be described below.

The energy of membrane 6 is released after a time interval $t_4$, shown in FIG. 2, following the cessation of the application of the primary pulse I. In practice, the natural frequency $f_E$ of the elastic membrane 6, its diameter and its thickness play a significant part in the operation of the ejector head. The natural frequency $f_E$ should be large enough that the duration of one oscillation, namely, $1/f_E$, corresponds to the time interval $t_4$.

In one embodiment of the invention, the membrane has a natural frequency $f_E$ equal to about 25 kHz, a thickness of about 0.1 mm, and a part which oscillates freely through cavity 7 and which has a diameter of about 4mm, thus giving the membrane a diameter-to-thickness ratio of about 40:1.

The experiment with the membrane was electrically measured, as shown in FIG. 2. Here, the primary pulse I corresponds to the pulse across ceramic oscillator 3 during the membrane test, with the secondary or follow-up pulse II corresponding to the pulse created by the release of the energy of membrane 6.

The primary electrical pulse I was applied to the ceramic oscillator in an ejector head according to FIG. 5 which is of the same design as that of FIG. 1 but without a membrane 6 and cavity 7. The pulses applied to ceramic oscillator 3 originate from a control unit 8. The duration $t_1$ of pulse I was 80$\mu$s (microseconds). After switching off of pulse I and a pause of $t_4$ of 36$\mu$s, a secondary or follow-up pulse II of slightly higher voltage was applied to the same ceramic oscillator. The pulse duration $t_2$ here had no influence on the control of the return flow of the ink in the nozzle.

A comparison of the test results between ink ejection in the conventional manner and ejection with the help of a follow-up pulse according to the invention showed that an ejector head operated at a frequency of 100 Hz and without follow-up signal caused the main drop to move at a velocity $V_H$ of 2.5 m/s (meters/second) and that the after-drop travelled at a velocity of 1.66 m/s. In the experiment with follow-up signal, no after-drop was noted and the main drop moved at a velocity of 2.5 m/s. Further experiments, conducted at frequencies up to 1000 Hz showed that no after-drops occurred in an ejector head operated with a follow-up signal. In experiments in which the main drop travelled at a velocity greater than 2.5 m/s, the developing after-drop could be accelerated to the velocity of the main drop. It was further noted that the drops formed during the operation with the follow-up signal were of a shape better suited for ink spraying than was the case during operation without follow-up signal, the reason for this being that the nozzle was filled with ink at the time the drop was ejected.

FIGS. 3 and 4 present on an enlarged scale, a comparison of the shape of the drops formed during conventional operation (FIG. 3) and during operation with the follow-up signal (FIG. 4) according to the invention. FIGS. 3 and 4 initially show drops in their formation and flight phases, occurring after 160$\mu$s and 240$\mu$s, respectively, with FIG. 4 additionally showing a drop after 156$\mu$s. The great enlargement of these figures shows the differences in constriction resulting from the entrance of air into the nozzle.

The wiring diagram in FIG. 6 shows the control unit 8, which is shown diagramatically in FIG. 5. The inputs 9 and 10 are connected with a pulse generator or microprocessor (not shown). The pulse generator produced a series of pulses, such as is shown in FIG. 2, and regulates the pulse duration $t_1$ and $t_2$, and pulses spacing $t_4$, as depicted in FIG. 2. Each pulse at input 9 blocks the transistor 11, each pulse at input 10 blocks the transistor 12. These transistors become conductive between the collector and emitter and the transistors 13 and 14 connect the ceramic oscillator 3 to the potentials $U_I$ and $U_{II}$ respectively.

Leak resistors 15 and 16 connect the bases of transistors 13 and 14 respectively, with the O V potential. The base resistors of these transistors are shown at 17 and 18, respectively. The ceramic oscillator is discharged by way of the resistor 19.

It will be appreciated from the above that one significant advantage of the present invention is in the improved legibility of alpha-numeric characters, because after-drops will strike the print carrier in the same location as the main drop. Moreover, the invention avoids the formation of after-drops which could result from excess ink due to the returning flow of ink and from the umbilical cord, and which would move at a slower velocity than the main drop due to reflected waves and which could drip off the nozzle. The membrane closing off the air-filled cavity increases the costs for the ejection head only slightly. Also, the minor additional costs for the circuitry for producing the alternating primary and secondary pulses are more than compensated for by the fact that the present invention allows the ejector to be used with inks having different viscosities and in which sound is propagated at different speeds. This is so because all that is required to adapt the ink ejector for use with inks having different physical characteristics is to make a fine adjustment of the intervals between the primary and secondary pulses.

The above notwithstanding, the present invention allows the return flow of the ink to be controlled in such a manner that after-drops are intentionally permitted to be formed, but which are applied to the print carrier between the main drops in such a way as to produce grey tones so as to allow images to be drawn on the carrier. This can be achieved by appropriately adapting the primary and/or secondary signals with respect to amplitude and pulse width.

It will be understood that the above description of the present invention is susceptible to various modifications, changes and adaptations, and the same are intended to be comprehended within the meaning and range of equivalents of the appended claims.

What is claimed is:

1. An arrangement comprising, in combination:

(a) an ink ejector head having an ink flow system incorporating (1) means forming a chamber capable of being supplied with ink from an ink reservoir and having a nozzle through which ink is ejected, and (2) a pressure producer capable of being subjected to pulses for applying pressure to the ink in said chamber so as to cause the ink to be ejected through said nozzle, said pressure producer being a ceramic oscillator comprising a ceramic oscillator element and first and second membranes, said second membrane being arranged in said ejector head and being spaced from said first membrane so as to divide the interior of said ejector head into an air chamber and an ink chamber; and (b) means for applying to said pressure producer a series of pulses consisting of alternating primary and secondary pulses of which only said primary pulses are pulses which cause the ink to be ejected through said nozzle, said secondary pulses occurring a predetermined time interval after the cessation of the application of the immediately preceding primary pulse and being pulses for counteracting the outside air pressure and preventing the entry of a column of air into said nozzle above the returning stream of ink when there is a pressure reduction in the ejection system, said secondary pulses being applied while said oscillator is at rest.

2. An arrangement as defined in claim 1, wherein said two membranes are positioned opposite each other.

3. An arrangement as defined in claim 1, wherein said predetermined time interval is equal to the time $1/f_E$, where $f_E$ is the natural frequency of said second membrane.

4. An arrangement as defined in claim 1, wherein said second membrane has a freely oscillating portion, the ratio of the diameter of the freely oscillating portion of said membrane to the thickness thereof being approximately 40:1.

* * * * *